(12) United States Patent
Brady et al.

(10) Patent No.: US 12,368,703 B2
(45) Date of Patent: *Jul. 22, 2025

(54) PROXY-LESS SECURE SOCKETS LAYER (SSL) DATA INSPECTION

(71) Applicant: Sonicwall US Holdings Inc., Milpitas, CA (US)

(72) Inventors: Justin M. Brady, Livermore, CA (US); Aleksandr Dubrovsky, San Mateo, CA (US); Boris Yanovsky, Saratoga, CA (US)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,606

(22) Filed: Sep. 1, 2020

(65) Prior Publication Data
US 2020/0403988 A1 Dec. 24, 2020

Related U.S. Application Data

(63) Continuation of application No. 15/685,768, filed on Aug. 24, 2017, now Pat. No. 10,764,274, which is a
(Continued)

(51) Int. Cl.
 *H04L 9/40* (2022.01)
 *H04L 9/32* (2006.01)

(52) U.S. Cl.
 CPC .......... *H04L 63/0823* (2013.01); *H04L 9/321* (2013.01); *H04L 9/3263* (2013.01);
 (Continued)

(58) Field of Classification Search
 CPC . H04L 63/0281; H04L 63/08; H04L 63/0823; H04L 63/0884; H04L 63/1408; H04L 63/166; H04L 9/321; H04L 9/3263
 See application file for complete search history.

(56) References Cited

U.S. PATENT DOCUMENTS 5,796,833 A * 8/1998 Chen ............... H04L 9/3263
 380/278
5,796,942 A 8/1998 Esbensen
 (Continued)

FOREIGN PATENT DOCUMENTS

| EP | 1 122 932 | 8/2001 |
|---|---|---|
| EP | 1 528 743 | 5/2005 |
| WO | WO 97/39399 | 10/1997 |

OTHER PUBLICATIONS

Aggarwal, N., "Improving the Efficiency of Network Intrusion Detection System", Indian Institute of Technology, pp. 1-40, May 3, 2006.
(Continued)

*Primary Examiner* — David Garcia Cervetti
(74) *Attorney, Agent, or Firm* — Polsinelli LLP

(57) ABSTRACT

Some embodiments of proxy-less Secure Sockets Layer (SSL) data inspection have been presented. In one embodiment, a secured connection according to a secured network protocol between a client and a responder is setup via a gateway device, which is coupled between the client and the responder. The gateway device transparently intercepts data transmitted according to the secured network protocol between the client and the responder. Furthermore, the gateway device provides flow-control and retransmission of one or more data packets of the data without self-scheduling the packet retransmissions using timeouts and based on the packet retransmission logic of either the client-side or the responder side of the connection. The gateway device is further operable to perform security screening on the data.

20 Claims, 6 Drawing Sheets

Related U.S. Application Data continuation of application No. 12/497,328, filed on Jul. 2, 2009, now Pat. No. 9,769,149.

(52) U.S. Cl.
CPC ...... *H04L 63/0281* (2013.01); *H04L 63/0884* (2013.01); *H04L 63/1408* (2013.01); *H04L 63/166* (2013.01)

(56) References Cited

U.S. PATENT DOCUMENTS

| | | | |
|---|---|---|---|
| 5,945,933 A | 8/1999 | Kalkstein | |
| 6,088,803 A | 7/2000 | Tso et al. | |
| 6,108,782 A | 8/2000 | Fletcher et al. | |
| 6,119,236 A | 9/2000 | Shipley | |
| 6,178,448 B1 | 1/2001 | Gray et al. | |
| 6,219,706 B1 | 4/2001 | Fan et al. | |
| 6,449,723 B1 | 9/2002 | Elgressy et al. | |
| 6,675,296 B1* | 1/2004 | Boeyen | H04L 9/3263 713/175 |
| 6,851,061 B1 | 2/2005 | Holland et al. | |
| 7,134,143 B2 | 11/2006 | Stellenberg et al. | |
| 7,136,359 B1* | 11/2006 | Coile | H04L 63/0236 370/248 |
| 7,152,164 B1 | 12/2006 | Loukas | |
| 7,185,368 B2 | 7/2007 | Copeland | |
| 7,249,377 B1* | 7/2007 | Lita | G06F 21/83 713/168 |
| 7,304,996 B1 | 12/2007 | Swenson et al. | |
| 7,360,091 B2* | 4/2008 | Aikawa | G06Q 20/06 705/13 |
| 7,461,250 B1* | 12/2008 | Duane | H04L 9/3263 713/168 |
| 7,506,368 B1* | 3/2009 | Kersey | H04L 9/14 726/12 |
| 7,600,257 B2 | 10/2009 | Dubrovsky | |
| 7,643,480 B2 | 1/2010 | Liu et al. | |
| 7,698,453 B2 | 4/2010 | Samuels et al. | |
| 7,809,386 B2 | 10/2010 | Stirbu | |
| 7,835,361 B1 | 11/2010 | Dubrovsky | |
| 7,839,859 B2 | 11/2010 | Kim et al. | |
| 7,849,502 B1 | 12/2010 | Bloch et al. | |
| 8,086,846 B2* | 12/2011 | Brabson | H04L 67/1001 713/151 |
| 8,130,747 B2 | 3/2012 | Li et al. | |
| 8,190,879 B2* | 5/2012 | Wang | H04L 63/30 713/153 |
| 8,214,635 B2* | 7/2012 | Wang | H04L 9/3263 726/11 |
| 8,244,855 B1* | 8/2012 | Walsh | G06F 11/3096 709/224 |
| 8,478,986 B2* | 7/2013 | Merugu | H04L 63/0428 713/153 |
| 8,549,157 B2* | 10/2013 | Schnellbaecher | H04L 63/0884 709/229 |
| 8,650,631 B2* | 2/2014 | Guo | H04L 63/02 726/4 |
| 8,700,892 B2* | 4/2014 | Bollay | G06F 21/606 713/153 |
| 8,707,043 B2* | 4/2014 | Wason | H04L 9/3273 713/153 |
| 8,782,393 B1* | 7/2014 | Rothstein | H04L 63/0281 726/13 |
| 8,843,750 B1* | 9/2014 | Sokolov | H04L 63/0823 713/175 |
| 9,160,718 B2* | 10/2015 | Martini | H04L 63/0428 |
| 9,467,424 B2* | 10/2016 | Gluck | H04L 63/0428 |
| 9,602,498 B2* | 3/2017 | Wang | H04L 63/166 |
| 9,680,801 B1* | 6/2017 | Martini | H04L 67/141 |
| 9,755,825 B2* | 9/2017 | O'Brien | H04L 63/061 |
| 9,769,149 B1 | 9/2017 | Brady | |
| 9,961,103 B2* | 5/2018 | Williams | H04L 63/0428 |
| 10,033,529 B2* | 7/2018 | Pahl | H04L 9/0844 |
| 10,063,591 B1* | 8/2018 | Jiang | H04L 63/1416 |
| 10,116,634 B2* | 10/2018 | Golshan | H04L 63/0272 |
| 10,291,651 B1* | 5/2019 | Chaubey | H04L 63/168 |
| 10,341,357 B2* | 7/2019 | Martini | H04L 63/107 |
| 10,397,006 B2* | 8/2019 | Bowen | H04L 63/0428 |
| 10,412,055 B2* | 9/2019 | Thomson | H04L 63/06 |
| 10,419,348 B2* | 9/2019 | du Toit | H04L 9/40 |
| 10,764,274 B2 | 9/2020 | Brady | |
| 10,862,869 B2* | 12/2020 | Frid | H04L 63/30 |
| 11,245,685 B2* | 2/2022 | Konda | H04L 9/0825 |
| 2002/0035681 A1* | 3/2002 | Maturana | H04L 63/0428 713/151 |
| 2002/0069129 A1* | 6/2002 | Akutsu | G06Q 30/06 705/26.35 |
| 2002/0083331 A1 | 6/2002 | Krumel | |
| 2002/0166069 A1* | 11/2002 | Zendzian | H04L 63/12 726/4 |
| 2002/0199098 A1* | 12/2002 | Davis | H04L 63/0442 713/160 |
| 2003/0014623 A1* | 1/2003 | Freed | H04L 9/40 713/150 |
| 2003/0014628 A1* | 1/2003 | Freed | H04L 63/0428 713/155 |
| 2003/0065800 A1 | 4/2003 | Wyschogrod et al. | |
| 2003/0084328 A1 | 5/2003 | Tarquini et al. | |
| 2003/0110208 A1 | 6/2003 | Wyschogrod et al. | |
| 2003/0145228 A1 | 7/2003 | Suuronen et al. | |
| 2003/0154399 A1 | 8/2003 | Zuk et al. | |
| 2003/0200437 A1* | 10/2003 | Oishi | H04L 9/3013 713/175 |
| 2004/0093513 A1 | 5/2004 | Cantrell et al. | |
| 2004/0123155 A1 | 6/2004 | Etoh et al. | |
| 2004/0199790 A1 | 10/2004 | Lingafelt et al. | |
| 2004/0255163 A1 | 12/2004 | Swimmer et al. | |
| 2005/0021999 A1* | 1/2005 | Touitou | H04L 69/161 726/11 |
| 2005/0050362 A1 | 3/2005 | Peles | |
| 2005/0086504 A1* | 4/2005 | You | H04L 63/0823 713/193 |
| 2005/0108411 A1 | 5/2005 | Kliland et al. | |
| 2005/0120243 A1 | 6/2005 | Palmer et al. | |
| 2005/0135380 A1 | 6/2005 | Sahita et al. | |
| 2005/0187916 A1 | 8/2005 | Levin et al. | |
| 2005/0216770 A1 | 9/2005 | Rowett et al. | |
| 2005/0262556 A1 | 11/2005 | Waisman et al. | |
| 2006/0020595 A1 | 1/2006 | Norton et al. | |
| 2006/0064750 A1* | 3/2006 | Kersey | H04L 63/16 726/14 |
| 2006/0069787 A1 | 3/2006 | Sinclair | |
| 2006/0077979 A1 | 4/2006 | Dubrovsky | |
| 2006/0090074 A1* | 4/2006 | Matoba | H04L 63/04 713/171 |
| 2006/0206707 A1* | 9/2006 | Kostal | G06F 21/33 713/156 |
| 2006/0272014 A1* | 11/2006 | McRae | H04L 63/1416 726/12 |
| 2007/0058551 A1 | 3/2007 | Brusotti et al. | |
| 2007/0113079 A1* | 5/2007 | Ito | G06F 9/468 713/166 |
| 2007/0133803 A1* | 6/2007 | Saito | H04L 67/52 380/267 |
| 2008/0034073 A1 | 2/2008 | McCloy et al. | |
| 2008/0086633 A1* | 4/2008 | Anderson | H04L 9/321 713/156 |
| 2008/0126794 A1* | 5/2008 | Wang | H04L 9/3263 713/153 |
| 2008/0178278 A1 | 7/2008 | Grinstein et al. | |
| 2008/0235755 A1 | 9/2008 | Blaisdell et al. | |
| 2008/0288458 A1* | 11/2008 | Sun | H04L 67/568 |
| 2008/0320297 A1* | 12/2008 | Sabo | H04L 63/06 726/14 |
| 2009/0201813 A1 | 8/2009 | Speight | |
| 2009/0271613 A1 | 10/2009 | Brabson | |
| 2010/0017848 A1* | 1/2010 | Pomerantz | H04L 63/20 726/2 |
| 2010/0325418 A1* | 12/2010 | Kanekar | H04L 63/0823 713/151 |

(56) References Cited

U.S. PATENT DOCUMENTS

| | | | | |
|---|---|---|---|---|
| 2010/0325419 A1* | 12/2010 | Kanekar | ............ | H04L 67/1001 713/151 |
| 2012/0131330 A1 | 5/2012 | Tonsing et al. | | |
| 2012/0272058 A1* | 10/2012 | Wang | ................. | H04L 63/0464 713/156 |
| 2012/0290833 A1* | 11/2012 | Clegg | .................. | H04L 9/3226 713/156 |
| 2014/0075186 A1* | 3/2014 | Austen | ................. | H04L 63/061 713/156 |
| 2014/0095865 A1* | 4/2014 | Yerra | .................... | H04L 9/3271 713/156 |
| 2014/0129828 A1* | 5/2014 | Rhee | ..................... | H04L 9/3263 713/156 |
| 2014/0143852 A1* | 5/2014 | Cottrell | .................. | H04L 67/56 726/12 |
| 2015/0172064 A1* | 6/2015 | Takenaka | ............. | H04L 9/3247 713/156 |
| 2015/0288514 A1* | 10/2015 | Pahl | ...................... | H04L 63/166 713/171 |
| 2016/0057114 A1* | 2/2016 | Unagami | ............. | H04W 12/08 713/171 |
| 2016/0119374 A1* | 4/2016 | Williams | ............. | H04L 9/3263 713/175 |
| 2016/0142211 A1* | 5/2016 | Metke | ................. | H04L 63/0823 713/175 |
| 2016/0226827 A1* | 8/2016 | Bohannon | ........... | H04L 63/0823 |
| 2016/0337321 A1* | 11/2016 | Lin | ....................... | H04L 9/3263 |
| 2017/0163633 A1* | 6/2017 | Yang | ..................... | H04L 67/14 |
| 2017/0163736 A1* | 6/2017 | Jiang | .................... | H04L 63/306 |
| 2017/0339118 A1* | 11/2017 | Hwang | ................. | H04L 63/061 |
| 2017/0374062 A1 | 12/2017 | Brady | | |
| 2018/0131525 A1* | 5/2018 | Kass | ..................... | H04L 63/101 |
| 2018/0288009 A1* | 10/2018 | Yang | .................. | H04L 63/0428 |
| 2018/0351997 A1* | 12/2018 | Lee | .......................... | H04L 67/01 |
| 2020/0084029 A1* | 3/2020 | Yang | ..................... | H04L 63/166 |
| 2021/0320940 A1* | 10/2021 | Batta | .................... | H04L 63/083 |
| 2022/0224782 A1* | 7/2022 | Wu | ....................... | H04L 69/323 |
| 2023/0269099 A1* | 8/2023 | Medvinsky | ........... | H04L 9/3247 713/158 |
| 2024/0250815 A1* | 7/2024 | Underwood | .......... | H04L 9/0894 |

OTHER PUBLICATIONS

Bellovin, S., "Firewall-Friendly FTP," Network Working Group, RFC No. 1579, AT&T Bell Laboratories, Feb. 1994, Http://www.ietf.org/rfc1579.txt?number=1579, downloaded Jul. 15, 2002, 4 pages.

Blyth, Andrew, "Detecting Intrusion", School of Computing, University of Glamorgan, 14 pages.

Branch, Joel, "Denial of Service Intrusion Detection Using Time Dependent Deterministic Finite Automata", RPI Graduate Research Conference 2002, Oct. 17, 2002. 7 pages.

Gateway Anti-Virus, Anti-Spyware and Intrusion Prevention Service, Unified Threat Management, Intelligent Real-time Protection, © 2005, 2 pp.

Giles, C., "Learning a Class of Large Finite State Machines with a Recurrent Neural Network", Neural Networks, vol. 8., No. 9, pp. 1359-1365, 1995.

Holzmann, G., "A Minimized Automaton Representation of Reachable States", Int J STTT 2, pp. 270-278, 1999.

Juniper Networks, "Architecture," www.juniper.net/products/intrusion/architecture.html, downloaded Jun. 11, 2004, 3 pages.

Juniper Networks, "Attack Detection," www.juniper.net/products/intrusion/detection.html, downloaded Jun. 11, 2004, 7 pages.

Juniper Networks, "Attack Prevention," www.juniper.net/products/intrusion/prevention.html, downloaded Jun. 11, 2004, 2 pages.

Juniper Networks, "Intrusion Detection and Prevention," www.juniper.net/products/intrusion/ downloaded Jun. 11, 2004, 2 pages.

Juniper Networks, "Juniper Networks NetScreen-IDP 10/100/500/1000," Intrusion Detection and Prevention, Spec Sheet, Apr. 2004, 2 pages.

Lucas, S., "Learning Deterministic Finite Automata with a Smart State Labeling Evolutionary Algorithm", IEEE Transaction on Pattern Analysis and Machine Intelligence , vol. 27, No. 7, pp. 1063-1074 Jul. 2005.

Krugal, Christopher, "Using Decision Trees to Improve Signature-Based Intrusion Detection", Sep. 8, 2003, RAID 2003: recent Advance in Intrusion Detection, 20 pages.

Roberts, Paul, "NetScreen Announces Deep Inspection Firewall," IDG News Service, Oct. 20, 2003, http://www.nwfusion.com/news/2003/1020netscannou.html, downloaded Jun. 11, 2004, 5 pages.

Roesch, Martin and Green, Chris, "Snort Users Manual," Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).

"Snort™: The Open Source Network Intrusion Detection System", accessed at: http://www.snort.org/about.html on Jun. 23, 2004, last updated Jun. 23, 2004, 2 pages.

SonicWALL Complete Anti-Virus, Automated and Enforced Anti-Virus Protection, © 2005, 2 pp.

SonicWALL Content Filtering Service, Comprehensive Internet Security™,© 2005, 2 pp.

SonicWALL Content Security Manager Series, Easy-to-use, Affordable, Content Security and Internet Threat Protection, © 2006, Dec. 2006. 4 pp.

SonicWALL Endpoint Security: Anti-Virus, Automated and Enforced Anti-Virus and Anti- Spyware Protection, © 2007, Mar. 2007, 2 pp.

SonicWALL Internet Security Appliances, "Content Security Manager Integrated Solutions Guide", Version 3.0, © 2007, 160 pp.

SonicWALL Internet Security Appliances, "SonicOS 3.8 Standard Administrator's Guide", © 2007, 362 pp.

SonicOS Standard 3.8.0.2 Release Notes, SonicWALL secure Anti-Virus Router 80 Series, SonicWALL, Inc., Software Release: Apr. 11, 2007, 13 pp.

"The Ultimate Internet Sharing Solution, WinProxy, User Manual," Copyright 1996-2002 Osistis Software, Inc., dated Feb. 2002 (290 pgs).

Van Engelen, R., "Constructing Finite State Automata for High-Performance XML Web Services", International Symposium on Web Services and Applications, pp. 1-7, 2004.

Villa, Oreste. Feb. 2008. IBM Research Report: Too many words, too little time: Accelerating real-time keyword scanning wth multi-core processors. Retrieved from http://domino.research.ibm.com/library/cyberdignsf/papers/9EB4740B4B0739CF852573F5005A6311/$FileIrc24488.pdf. Retrieval data Mar. 5, 2012, 6 pgs.

CN Application No. 093133045, Republic of China Search Report dated Aug. 5, 2011, 1 pg.

EP Application No. EP 04 02 5579, European Search Report dated May 23, 2005, 3 pages.

Taiwan Application No. 093133045; Office Action dated Sep. 8, 2011.

U.S. Appl. No. 12/497,328; Final Office Action mailed Nov. 17, 2016.

U.S. Appl. No. 12/497,328; Office Action mailed Dec. 30, 2015.

U.S. Appl. No. 12/497,328; Final Office Action mailed Mar. 17, 2015.

U.S. Appl. No. 12/497,328; Office Action mailed Aug. 14, 2014.

U.S. Appl. No. 12/497,328; Final Office Action mailed Aug. 15, 2013.

U.S. Appl. No. 12/497,328; Office Action mailed Jan. 31, 2012.

U.S. Appl. No. 15/685,768; Final Office Action mailed Jan. 24, 2020.

U.S. Appl. No. 15/685,768; Office Action mailed Jun. 10, 2019.

* cited by examiner

PROXY-LESS SECURE SOCKETS LAYER (SSL) DATA INSPECTION

CROSS REFERENCE TO RELATED APPLICATIONS

This application is a continuation of U.S. patent application Ser. No. 15/685,768 filed on Aug. 24, 2017, now U.S. Pat. No. 10,764,274 which is a Continuation of U.S. patent application Ser. No. 12/497,328 filed on Jul. 2, 2009, now U.S. Pat. No. 9,769,149, the entire content of each of which is incorporated herein by reference.

TECHNICAL FIELD

The present invention relates to intrusion detection and prevention in a networked system, and more particularly, to providing proxy-less data inspection.

BACKGROUND

FIG. 1 illustrates a current networked system 100. Conventionally, to make a secure connection between the client 110 and a server 120, the following operations are performed. A web browser on the client is configured to point to a proxy Internet Protocol (IP) address for Hypertext Transfer Protocol Secured (HTTPS) connections. An initial CONNECT request with full Universal Resource Locator (URL) is sent by the client 110 to a proxy 130 between the client 110 and the server 120. The proxy 130 connects to the HTTPS server 120 using the full URL provided in the client's 110 request. The HTTPS server 120 sends back a certificate. The proxy 130 strips out relevant information from the certificate (e.g., common name, etc.) and creates a new certificate signed by a certification-authority certificate, which the user of the proxy 130, i.e., the client 110, has indicated to trust. Eventually, the newly generated certificate is passed to the client 110 and the client 110 accepts the certificate.

Data is decrypted on one connection, and clear-text (i.e., decrypted data) is inspected. Then the data is re-encrypted when sent on another connection. As a result, two TCP/SSL connections 115 and 125 are established, namely, a first connection 125 between the proxy 130 and the server 120, and a second connection 115 between the client 110 and the proxy 130, where each connection supports full Transmission Control Protocol (TCP) flow-control logic. Packet loss re-transmissions are handled individually for each connection and all retransmission scheduling is done on the proxy 130.

One disadvantage of the above scheme is that the client's 110 browser has to be configured with the proxy's IP address. The above scheme is not so scalable due to full TCP based flow control implemented on the inspecting device and due to the fact that sockets do not scale well for large number of connections. Furthermore, it is difficult to configure for non-HTTP protocols.

BRIEF DESCRIPTION OF THE DRAWINGS

The present invention is illustrated by way of example, and not by way of limitation, in the figures of the accompanying drawings and in which.

DETAILED DESCRIPTION

Figure 1:
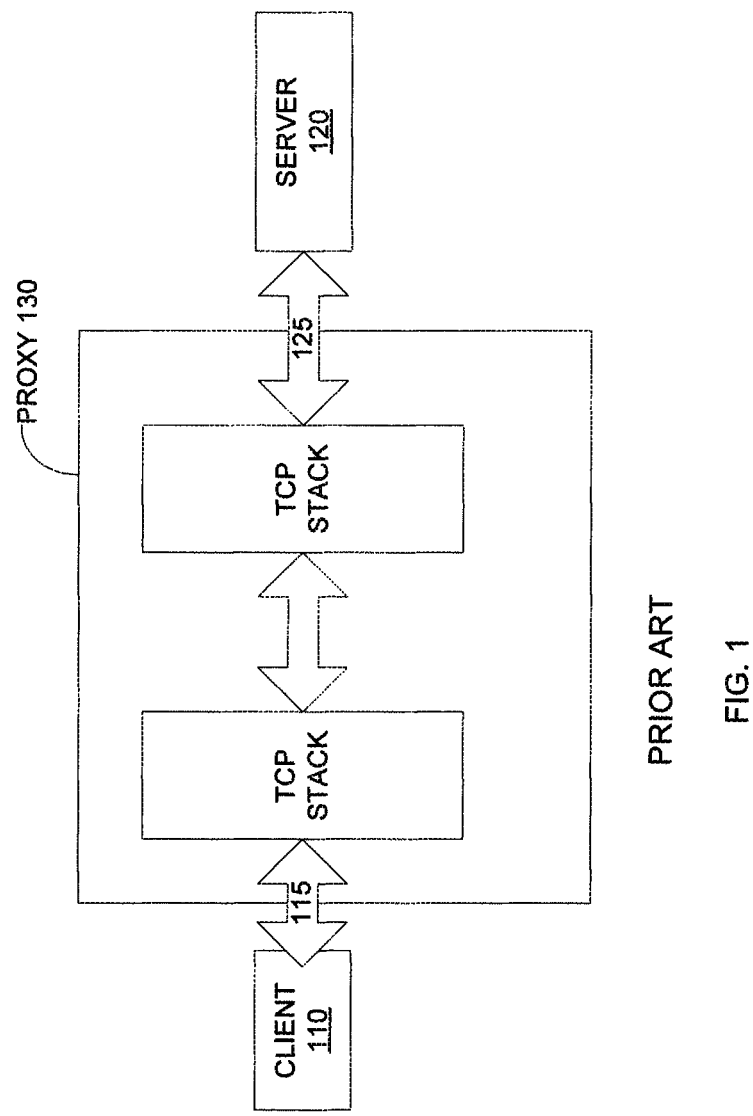
FIG. 1 illustrates a conventional networked system with a proxy.

Described herein are some embodiments of proxy-less Secured Sockets Layer (SSL) data inspection. In one embodiment, a TCP connection is established between a client (a.k.a. the initiator) and a HTTPS server (a.k.a. the responder). The client's web browser (or any network access application) issues a connection request, e.g., SSL Hello, to the server. A proxy-less SSL inspection appliance, such as a gateway device, intercepts the Hello request and sends an identical copy to the server. In response, the server sends a certificate to the proxy-less SSL inspection appliance. The proxy-less SSL inspection appliance strips out relevant information from the certificate (e.g., common name, etc.) and creates a new certificate signed by a certification-authority certificate, which the client has indicated to trust. The newly generated certificate is passed from the proxy-less SSL inspection appliance to the client. The client accepts the newly generated certificate because this certificate is signed by the certification-authority certificate. Packets received by the proxy-less SSL inspection appliance are decrypted and inspected by the proxy-less SSL inspection appliance using various mechanisms, such as deep packet inspection (DPI), content filtering, etc. After inspection, the proxy-less SSL inspection appliance re-encrypts the packets and forwards the packets to the client if there is no security issue with passing the packets. If potential malware or forbidden content is found in the packets, then the proxy-less SSL inspection appliance may block the packets from the client. The proxy-less SSL inspection appliance may further send a message to warn the client of its finding.

In the above scheme, TCP re-transmission logic is event driven based on retransmissions from server side and client side, rather than being scheduled by a TCP stack on each side of the TCP connection. In other words, the proxy-less SSL inspection appliance provides flow-control and retransmission of data packets without self-scheduling the packet retransmission using timeouts, but rather, based on the packet retransmission logic of either the client-side or server-side of the connection. As a result, security inspection of clear-text can take place at the proxy-less SSL inspection appliance without using a full TCP-based proxy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMS), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
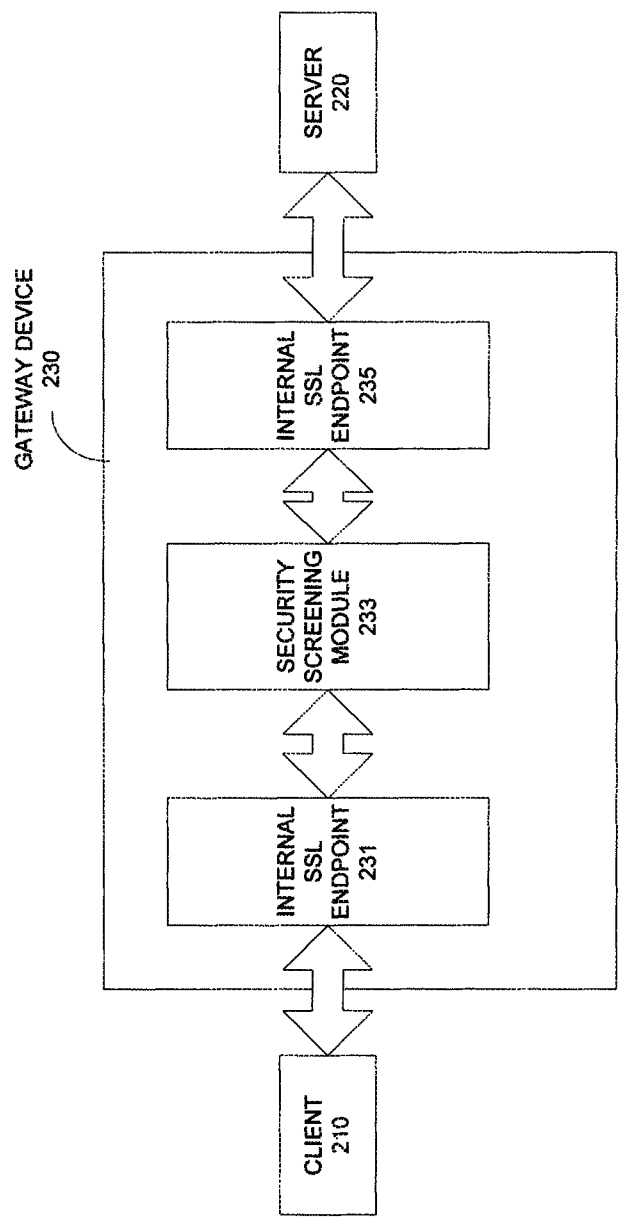
FIG. 2 illustrates one embodiment of a proxy-less system.

FIG. 2 illustrates one embodiment of a proxy-less system. The proxy-less system 200 includes a client 210, a server 220, and a gateway device 230 coupled between the client 210 and the server 220. When the client 210 initiates a connection with the server 220, the client 210 may be referred to as an initiator and the server 220 may be referred to as a responder, and vice versa. The client 210 and the server 220 may be implemented using various computing devices, such as personal computers, laptop computers, personal digital assistants (PDAs), cellular telephones, Smartphones, etc. The gateway device 230 may also be implemented using various computing devices, such as those listed above. In some embodiments, the gateway device 230 is implemented as a set-top box coupled to the client 210 locally. The gateway device 230 acts as a "middleman" device between the client 210 and the server 220.

In some embodiments, the gateway device 230 may intercept a client connection request from the initiator, say the client 210, before it reaches the intended endpoint, say the server 220, and generate IP TCP packets as replies as if they were originated from that endpoint, and to do the same for communication with the original responder endpoint. Separate TCP state is kept for communication with the initiator and responder endpoints at the gateway device 230. This state contains data allowing the gateway device 230 to do flow-control and retransmission. For example, the state may include a sequence number of the last packet received, which may be used in determining if the next packet is dropped or lost. In order to increase scalability and to simplify the gateway device 230, TCP retransmission to a receiver may only be done when a retransmit from the sender is seen in some embodiments. Data from one side is not acknowledged until it is acknowledged by the opposite endpoint.

During connection setup, the TCP handshake is allowed to complete between the two hosts, but once the client attempts to send data to negotiate a secured connection (e.g., SSL), the request is passed to an internal secured endpoint (such as the internal secured endpoint 231 or 235 in FIG. 2) on the gateway device 230. Before this endpoint continues negotiation, the gateway device 230 may first initiate a secured client connection to the responder endpoint, store the responder certificate details, and complete the key exchange.

Afterwards, secured connection certificate and/or key exchange and negotiation is completed with the initiator, optionally using a certificate dynamically generated with details from the responder certificate as discussed below. Because the gateway device 230 chooses the public keys and does the negotiation to terminate the SSL connection, it is possible for the gateway device 230 to inspect the clear text data sent by both sides. Once both connections are established, decrypted clear text data is transferred from one connection to the other as follows.

In some embodiments, the data received by the gateway device 230 from the initiator may be encrypted and sent over the responder secured connection, and vice versa. In this way, it is possible to view and/or modify the clear text data sent from one endpoint to the other. No configuration on either end (i.e., the client 210 and the server 220) is necessary because the gateway device 230 which sits on the path between the two sides can detect when to attempt secured decrypting and/or re-encrypting by detecting a connection to a known SSL TCP port, or by detecting a presence of a valid SSL Hello packet to any port. As opposed to a conventional explicit third party SSL proxy, where the connecting client must be aware of the forwarding proxy relationship and contact the proxy SSL endpoint directly, both sides' TCP and SSL states appear to be communicating with their original endpoints, so this interception is transparent to both sides.

As discussed above, the gateway device 230 may dynamically generate a certificate in the process of establishing a secured connection between the client 210 and the server 220. In some embodiments, the client 210 may use RSA encryption to verify a certificate delivered by the server 220 is "signed" by a third party authority that has previously been trusted by the client 210. For instance, the client 210 may have previously accepted a certification-authority (CA) certificate from this third party. When the gateway device 230 intercepts the secured connection and responds using its own internal secured endpoint 235, it is necessary to deliver a certificate containing a public key that the gateway device 230 has the private key for, so that key exchange is possible. The certificate also contains attributes to identify the endpoint to the client 210. In general, the client 210 may verify these attributes before continuing to negotiate further. If the attributes do not all match what is expected, the client 210 may warn the user before continuing. In order to appear legitimate, the certificate details from the responder certificate from the server 220 are stored by the gateway device 230 and a new certificate is generated that appears substantially identical, except for the public key. The newly generated certificate is then signed by the CA certificate, which the client 210 has previously trusted. In this way, all checks done by the client 210 on the certificate may pass, and the client may complete the connection and begin sending data to the server 220 via the gateway device 230.

Figure 3:
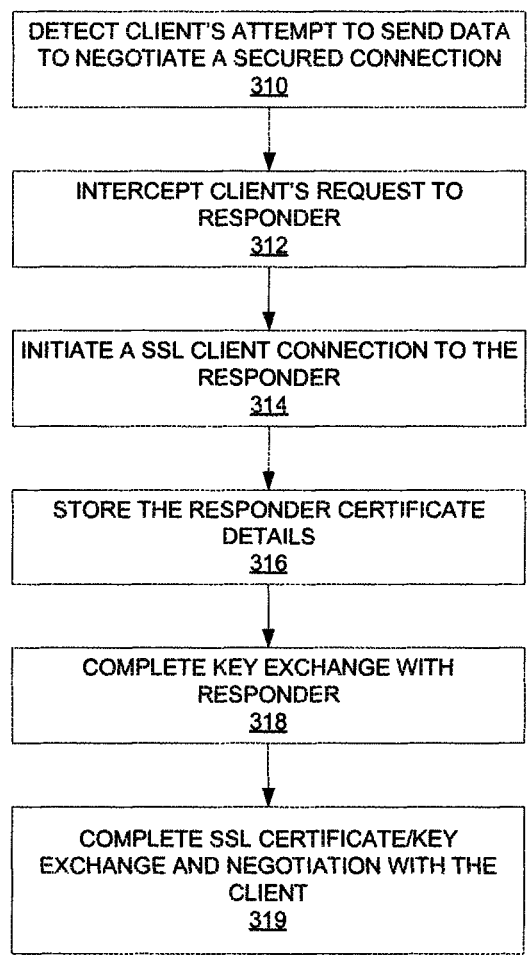
FIG. 3 illustrates one embodiment of a method to establish a secured connection between a client and a responder without a proxy.

FIG. 3 illustrates one embodiment of a method to establish a secured connection between a client and a responder without a proxy. The method may be performed by processing logic that may comprise hardware (e.g., circuitry, dedicated logic, programmable logic, processing cores, etc.), software (such as instructions run on a processing core), firmware, or a combination thereof.

Initially, processing logic detects a client's attempt to send data to negotiate a secured connection with a responder (processing block 310). For example, the secured connection may be SSL. Then processing logic intercepts the client's request to responder (processing block 312). Processing logic initiates a secured client connection to the responder (processing block 314). In response, the responder may send a certificate to processing logic. Processing logic stores the responder's certificate details (processing block 316). Then processing logic completes key exchange with the responder (processing block 318). Finally, processing logic completes secured connection certificate and/or key exchange and negotiation with the client (processing block 319). To complete secured connection certificate and/or key exchange and negotiation with the client, processing logic may dynamically generate a new certificate to send to the client.

Figure 4:
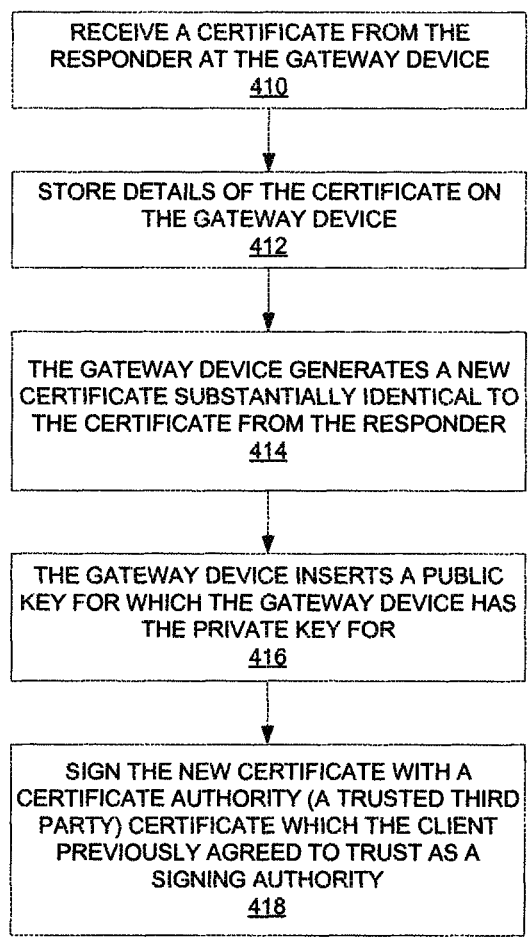
FIG. 4 illustrates one embodiment of a method to dynamically generate a certificate.

FIG. 4 illustrates one embodiment of a method to dynamically generate a certificate. The method may be performed by processing logic that may comprise hardware (e.g., circuitry, dedicated logic, programmable logic, processing cores, etc.), software (such as instructions run on a processing core), firmware, or a combination thereof.

Initially, processing logic receives a certificate from the responder at a gateway device (processing block 410). Then processing logic stores details of the certificate, such as common name, on the gateway device (processing block 412). Processing logic generates a new certificate substantially identical to the certificate from the responder at the gateway device (processing block 414). Processing logic inserts a public key into the certificate at the gateway device, where the gateway device has the private key for the public key (processing block 416). In some embodiments, the public key is pre-generated at the gateway device along with its private key pair. Finally, processing logic signs the new certificate with a certificate authority (usually a trusted third party) certificate, which the client has previously agreed to trust as a signing authority (processing block 418). Note that the same public key may be inserted into all new certificates subsequently generated at the gateway device for the current connection.

Figure 5:
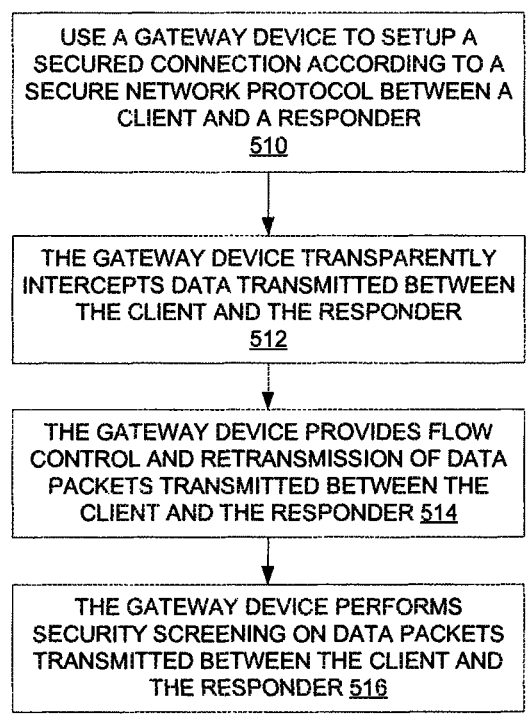
FIG. 5 illustrates one embodiment of a method to perform proxy-less data inspection.

FIG. 5 illustrates one embodiment of a method to perform proxy-less data inspection. The method may be performed by processing logic that may comprise hardware (e.g., circuitry, dedicated logic, programmable logic, processing cores, etc.), software (such as instructions run on a processing core), firmware, or a combination thereof.

Initially, processing logic uses a gateway device (such as the gateway device 230 shown in FIG. 2) to set up a secured connection according to a secure network protocol (e.g., SSL) between a client and a responder (processing block 510). Details of some embodiments of the secured connection setup have been discussed in details above. Then processing logic uses the gateway device to transparently intercept data transmitted between the client and the responder (processing block 512). Processing logic further uses the gateway device to provide flow control and retransmission of data packets transmitted between the client and the responder (processing block 514). The flow control and retransmission of data may be provided without self-scheduling the packet retransmission using timeouts at the gateway device, but rather, based on the packet retransmission logic of either the client-side or the responder-side of the connection. Using the gateway device, processing logic performs security screening on data packets transmitted between the client and the responder (processing block 516). The security screening may include content filtering, deep packet inspection, etc.

Figure 6:
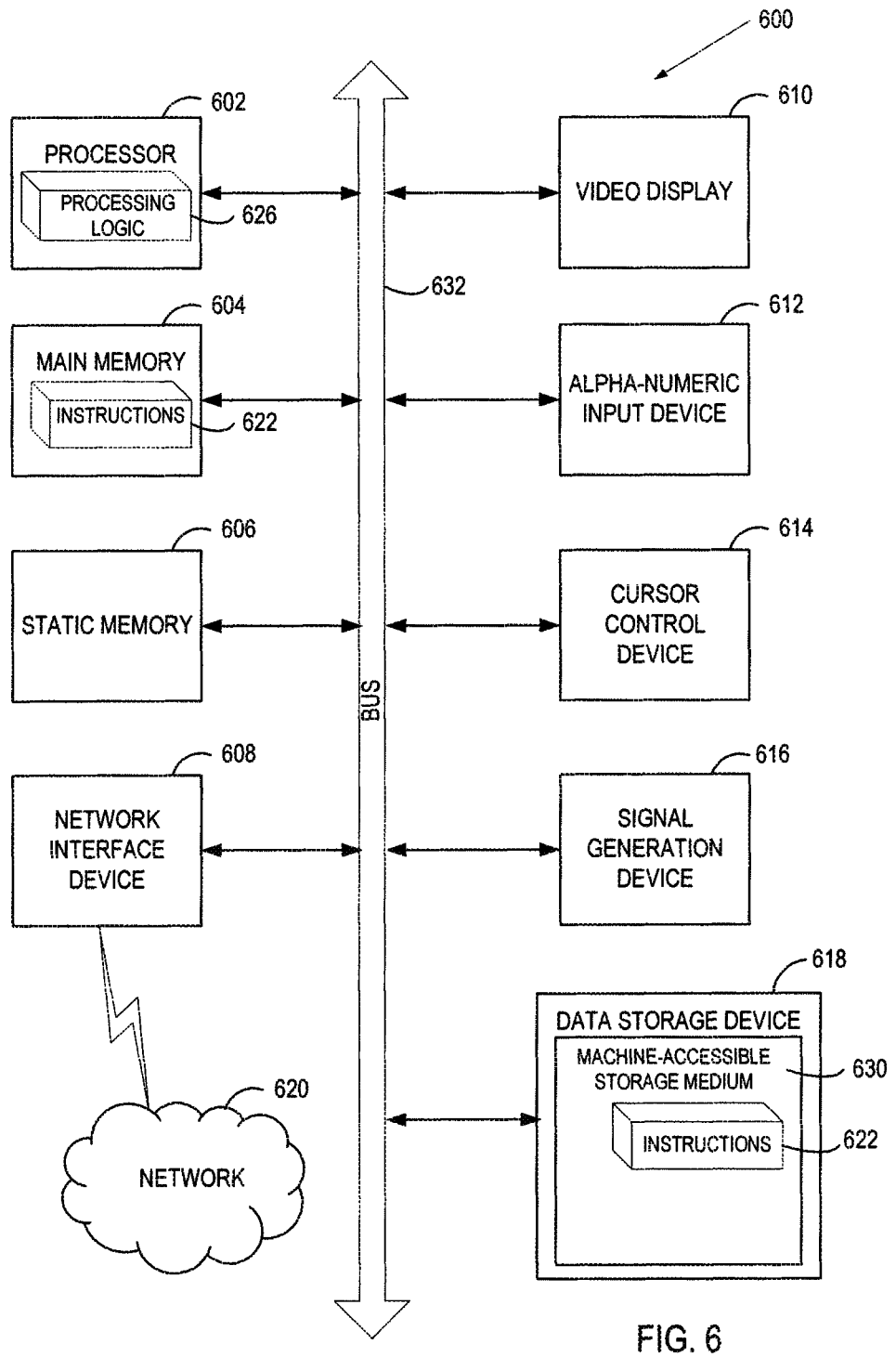
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 518 may include a machine-accessible storage medium 630 (also known as a machine-readable storage medium or a computer-readable medium) on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc. In some embodiments, machine-accessible storage medium may also be referred to as computer-readable storage medium.

Thus, some embodiments of cloud-based gateway antivirus scanning have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for establishing a proxy-less communication session, the method comprising:
    performing a first key exchange of a first public key between a gateway device and a server;
    performing a second key exchange of a second public key between the gateway device and a client device after the first key exchange;
    receiving a data packet at the gateway device, wherein the data packet includes information encrypted at the server using the first public key;
    decrypting the encrypted information included in the data packet received from the server, wherein the decrypted information is inspected in accordance with deep packet inspection by the gateway device;
    generating a first certificate that includes the first public key and a set of attributes associated with the client device;
    storing certificate details of the first certificate in gateway memory of the gateway device;
    generating encrypted data in response to an indication the decrypted information passes inspection;
    detecting when to transmit the encrypted data based on transmission information communicated from the server and the client device and verification of the set of attributes associated with the client device;
    sending the first certificate and the encrypted data transparently from the gateway device to the client device, wherein sending the first certificate is transparent to the server, and wherein the encrypted data are decrypted at the client device using the second public key;
    receiving a first acknowledgement from the client device acknowledging receipt of the encrypted data included in the data packet have been received by the gateway device;
    sending a second acknowledgement from the gateway device to the server based on the receipt of the first acknowledgement from the client device, wherein sending the second acknowledgement is transparent to the client device, and wherein the second acknowledgement indicates that the data packet has been received, and the second acknowledgement is not sent to the server until after the first acknowledgement is received from the client device indicating that the encrypted data included in the data packet have been received at the client device;
    generating a second certificate that is a modified copy of the first certificate, wherein a public key of the second certificate is different from a public key of the first certificate, and wherein a remaining portion of the second certificate is identical to a remaining portion of the first certificate; and
    establishing the communication session between the client device and the server using the gateway device without a proxy based on an identification that the second certificate matches a previously trusted certificate, wherein the gateway device provides flow control of data transmitted between the client device and the server in the established communication session.

2. The method of claim 1, further comprising receiving the first certificate from the server, and passing the second certificate to the client device.

3. The method of claim 1, wherein the encrypted information corresponds to the data packet, and further comprising:
    identifying that the data packet includes data associated with a security screening based on the inspection; and
    executing the security screening using the gateway device based on the identification.

4. The method of claim 3, wherein executing the security screening includes blocking a further data packet from being transmitted to the client device.

5. The method of claim 3, wherein executing the security screening includes sending a warning message from the gateway device to the client device.

6. The method of claim 3, wherein inspecting the decrypted information includes the deep packet inspection by the gateway device.

7. The method of claim 3, wherein executing the security screening includes using the gateway device to filer content of data received from the server.

8. The method of claim 1, further comprising:
    intercepting one or more data packets transmitted according to a secured network protocol between the client device and the server while remaining transparent to the client device and the server;
    maintaining a first set of state information for the client device, the first set of state information including a sequence number of a last packet received by the client device; and
    retransmitting the last data packet corresponding to the sequence number to the client device based on the first set of state information.

9. The method of claim 8, wherein retransmitting the last data packet is further based on a retransmission received from the server.

10. The method of claim 1, further comprising attempting decryption of the information that is encrypted in the data packet based on detection of a connection to a known SSL TCP port.

11. The method of claim 1, further comprising attempting decryption of the information that is encrypted in the data packet based on detection of a valid secure socket layer (SSL) Hello packet to a known port.

12. A non-transitory computer-readable storage medium having embodied thereon a program executable by a processor for implementing a method for establishing a proxy-less communication session, the method comprising:
performing a first key exchange of a first public key between a gateway device and a server;
performing a second key exchange of a second public key between the gateway device and a client device after the first key exchange;
receiving a data packet at the gateway device, wherein the data packet includes information encrypted at the server using the first public key;
decrypting the encrypted information included in the data packet received from the server, wherein the decrypted information is inspected in accordance with deep packet inspection by the gateway device;
generating a first certificate that includes the first public key and a set of attributes associated with the client device;
storing certificate details of the first certificate in gateway memory of the gateway device;
generating encrypted data in response to an indication the decrypted information passes inspection;
detecting when to transmit the encrypted data based on transmission information communicated from the server and the client device and verification of the set of attributes associated with the client device;
sending the first certificate and the encrypted data transparently from the gateway device to the client device, wherein sending the first certificate is transparent to the server, and wherein the encrypted data are decrypted at the client device using the second public key;
receiving a first acknowledgement from the client device acknowledging receipt of the encrypted data included in the data packet have been received by the gateway device;
sending a second acknowledgement from the gateway device to the server based on the receipt of the first acknowledgement from the client device, wherein sending the second acknowledgement is transparent to the client device, and wherein the second acknowledgement indicates that the data packet has been received, and the second acknowledgement is not sent to the server until after the first acknowledgement is received from the client device indicating that the encrypted data included in the data packet have been received at the client device;
generating a second certificate that is a modified copy of the first certificate, wherein a public key of the second certificate is different from a public key of the first certificate, and wherein a remaining portion of the second certificate is identical to a remaining portion of the first certificate; and
establishing the communication session between the client device and the server using the gateway device without a proxy based on an identification that the second certificate matches a previously trusted certificate, wherein the gateway device provides flow control of data transmitted between the client device and the server in the established communication session.

13. The non-transitory computer-readable storage medium of claim 12, wherein the encrypted information corresponds to the data packet, and further comprising instructions executable to:
identify that the data packet includes data associated with a security screening based on the inspection; and
execute the security screening using the gateway device based on the identification.

14. The non-transitory computer-readable storage medium of claim 13, wherein executing the security screening includes blocking a further data packet from being transmitted to the client device.

15. The non-transitory computer-readable storage medium of claim 13, wherein executing the security screening includes sending a warning message from the gateway device to the client device.

16. The non-transitory computer-readable storage medium of claim 13, wherein executing the security screening includes using the gateway device to filter content of data received from the server.

17. The non-transitory computer-readable storage medium of claim 13, wherein inspecting the decrypted information includes the deep packet inspection by the gateway device.

18. The non-transitory computer-readable storage medium of claim 12, further comprising instructions executable to:
intercept one or more data packets transmitted according to a secured network protocol between the client device and the server while remaining transparent to the client device and the server;
maintain a first set of state information for the client device, the first set of state information including a sequence number of a last packet received by the client device; and
retransmit the last data packet corresponding to the sequence number to the client device based on the first set of state information.

19. The non-transitory computer-readable storage medium of claim 18, wherein retransmitting the last data packet is also based on receiving a retransmission from the server.

20. A gateway apparatus for establishing a proxy-less communication session, the gateway apparatus comprising:
a memory;
a communication interface that communicates over a communication network to:
perform a first key exchange of a first public key with a server, and
perform a second key exchange of a second public key with a client device; and
a processor that executes instructions out of the memory to:
access a received data packet that includes information encrypted at the server using the first public key,
decrypt the encrypted information included in the data packet received from the server, wherein the decrypted information is inspected in accordance with deep packet inspection,
generate a first certificate that includes the first public key and a set of attributes associated with the client device, store certificate details of the first certificate in the memory,
generate the encrypted data in response to an indication the decrypted information passes inspection, wherein the encrypted data are decrypted at the client device using the second public key, wherein the communication interface sends the first certificate including the encrypted data transparently to the client device, wherein sending the first certificate is also transparent to the server,
detect when to transmit the encrypted data based on transmission information communicated from the server and the client device and verification of the set of attributes associated with the client device, wherein the communication interface further:
sends the first certificate and the encrypted data transparently to the client device, wherein sending the first certificate is transparent to the server, and wherein the encrypted data is decrypted at the client device using the second public key,
receives a first acknowledgement from the client device acknowledging receipt of the encrypted data included in the data packet has been received, and
sends a second acknowledgement to the server based on the receipt of the first acknowledgement from the client device, wherein sending the second acknowledgement is transparent to the client device, and wherein the second acknowledgement indicating that the data packet has been received, and the second acknowledgement is not sent to the server until after the first acknowledgement is received from the client device indicating that the encrypted data included in the data packet has been received at the client device,
generate a second certificate for transmission to the client device that is a modified copy of the first certificate, wherein a public key of the second certificate is different from a public key of the first certificate, and wherein a remaining portion of the second certificate is identical to a remaining portion of the first certificate, and
establish the communication session between the client device and the server without a proxy based on an identification that the second certificate matches a previously trusted certificate, wherein flow control is provided for data transmitted between the client device and the server in the established communication session.

\* \* \* \* \*